United States Patent [19]

Tanaka et al.

[11] Patent Number: 4,967,251
[45] Date of Patent: Oct. 30, 1990

[54] THIN FILM ELECTROLUMINESCENT DEVICE CONTAINING GADOLINIUM AND RARE EARTH ELEMENTS

[75] Inventors: Koichi Tanaka, Nara; Akiyoshi Mikami, Yamatotakada; Kouji Taniguchi, Nara, all of Japan

[73] Assignee: Sharp Kabushiki Kaisha, Osaka, Japan

[21] Appl. No.: 391,998

[22] Filed: Aug. 10, 1989

[30] Foreign Application Priority Data

Aug. 12, 1988 [JP] Japan .................. 63-202161

[51] Int. Cl.$^5$ .................. H01L 27/14; H01L 37/00; H01L 49/02
[52] U.S. Cl. .................. 357/30; 357/6; 428/690; 428/917; 313/509
[58] Field of Search .................. 357/30 B, 17, 6; 428/690, 917; 313/509

[56] References Cited

U.S. PATENT DOCUMENTS

| | | | |
|---|---|---|---|
| 4,454,446 | 6/1984 | Kobayashi | 313/480 |
| 4,510,414 | 4/1985 | Fujino et al. | 313/468 |
| 4,594,282 | 6/1986 | Kawaguchi | 313/509 |
| 4,603,280 | 7/1986 | Pankove | 313/509 |
| 4,672,226 | 6/1987 | Taniguchi et al. | 313/509 |

OTHER PUBLICATIONS

Kobayashi, "Mutlicolor Electroluminescent ZnS Thin Films . . . " pp. 713–720.
"Electroluminescence of ZnS Lumocen Devices Containing Rare-Earth and Transition-Metal Fluorides" E. W. Chase et al., Dec. 5, 1968, J. Appl. Phys. #40/6., pp. 2512–2519.
"Color Electroluminescent Devices Prepared by Metal Organic Chemical Vapor Deposition" K. Hirabayashi et al., Japan Display, 1986, pp. 254–257.
"Multicolor Electroluminescent ZnS Thin Films Doped with Rare Earth Fluorides", H. Kobayashi et al., pp. 713–720.
"High-Brightness Green-Emitting Electroluminescent Devices with ZnS:Tb,F Active Layers" T. Ogura et al., Apr. 15, 1986, pp. 1570–1571, Appl. Phys. Lttrs 48/23).

*Primary Examiner*—Andrew J. James
*Assistant Examiner*—Stephen D. Meier

[57] ABSTRACT

A thin film electroluminescent(EL) device includes a luminescent layer, both sides of which are covered with insulating layers, and at least one pair of electrodes sandwiching the luminescent layer through the insulating layers. The luminescent layer is composed of zinc sulfide in which Gd and a luminously effective amount of a rare earth element, acting as luminescent center, are doped at a total amount of 1–4 atomic percent.

25 Claims, 5 Drawing Sheets

F I G. 6
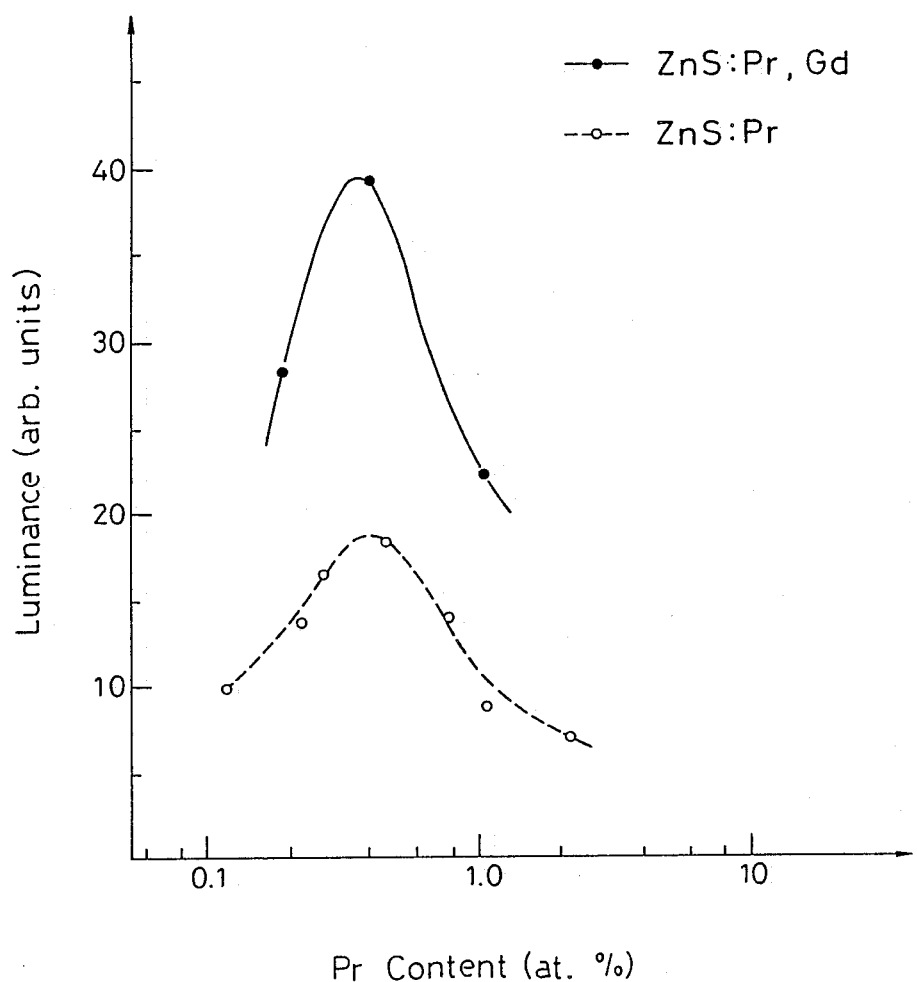

THIN FILM ELECTROLUMINESCENT DEVICE CONTAINING GADOLINIUM AND RARE EARTH ELEMENTS

BACKGROUND OF THE INVENTION

1. Field of the Invention

The invention relates to a thin film electroluminescent (EL) device, and more partiucularly to an improvement in luminance of an electroluminescent device that emits in response to the application of an AC electric field.

2. Description of the Prior Art

Conventionally, since the development of electroluminescence (EL) that can be obtained by applying an AC electric field to zinc sulfide (ZnS), various investigations have been made concerning luminescent center elements to be doped, fluorescent host materials and the like. Particularly, a thin film electroluminescent device in the so-called double insulating structure is so constructed that a ZnS thin film containing manganese (Mn) as a luminescent center element is first sandwiched with insulating layers. It is further covered at both sides with electrodes, at least one of which is transparent. Such an electroluminescent device, as a thin and lightweight display, has been rather broadly used in a portable computer and a measuring device. Recently, luminescent devices having a larger capacity, such as 720×400 dots (about 300,000 picture elements) corresponding to enlargement of displays, have been marketed.

A basic structure of a double insulating thin film electroluminesenct device is shown in FIG. 3. The device is so constructed that a transparent electrode 2, a first insulating layer 3, a luminescent layer 4, a second insulating layer 5, and a back electrode 6 are deposited in the mentioned order on a transparent substrate 1, made of glass and the like, by thin film deposition technology such as electronbeam deposition, a sputtering process or the like. Between the transparent electrode 2 and the back electrode 6 is connected an AC power source 7. When voltage is applied which is more than a threshold voltage (Vth), it shows a broad emitting spectrum having peak length wave at 585 nm, inherent in Mn luminescent center. The emission color is yellowish-orange.

However, thin film electroluminescent devices, which are practically used now, are only the above-mentioned ones using ZnS:Mn luminescent layer, which achieve only monochrome display. Accordingly, it is believed that a thin film electroluminescent device enabling multi-color display has not been realized.

Thus, it is desirable that a luminescent layer emitting various colors other than yellowish-orange, particularly, three primary colors of red, green and blue, be developed to provide a multi-color or full-color display thin film electroluminescent device. In this regard, a ZnS:Ln luminescent layer, using rare earth elements (called hereinafter Ln) as a luminescent center element, shows a luminescent spectrum ingerent in Ln, due to the 4 f electron transition. Thus, a red color emission can be obtained by Sm and Eu, green by Tb, and blue by Tm. This has been reported in "Electroluminescence of ZnS Lumocen Devices Containing Rare-Earth and Transition-Metal Fluorides" J.Appl.Phys.Vol. 40, No. 6, p.p. 2512–2519 (1969); "Color Electrolumnescent Devices Prepared by Metal Organic Chemical Vapor Deposition" JAPAN DISPLAY '86, p.p 254–257; and multicolor "Electroluminescent ZnS Thin Films Doped with Rare Earth Fluorides" phys. stat. sol (a) 88,713 (1985).

Although investigations have been actively made, when using a ZnS:Ln luminescent layer, it cannot achieve a sufficient brightness in each of the emission colors and is thus unable to be used practically.

Also, a high brightness green-emitting electroluminescent device using a ZnS:Tb luminescent layer, fabricated by means of sputtering method/has been reported ["High-brightness green-emitting electrolumine- scent devices with ZnS:Tb,F active layers", Appl. Phys. Lett. 48(23), 9 June 1986].

However, it has not been known that ZnS:Ln luminescent layers other than ZnS:Tb luminescent layer show high luminance.

SUMMARY OF THE INVENTION

According to the present invention, a thin film EL device is provided which includes a luminescent layer, both sides of which are covered with insulating layers, and one pair of electrodes, at least one of which is transparent sandwiching said luminescent layer through the insulating layers. The luminescent layer is composed of zinc sulfide in which Gd and a luminously effective amout of a rare earth element acting as luminescent center are doped at a total amount of 1–4 at. %.

The thin film electroluminescent device of the present invention can emit various color corresponding to the kinds of rare earth elements used and thus realize multi-color or full color display when the device is composed of a suitable combination of rare earth elements, utilizing the principle of red-green-blue picture elements.

Also, the thin film electroluminescent device can show a significantly improved brightness of luminescence in comparison with the conventional devices.

The invention is based on such a finding that upon fabrication of ZnS:Ln luminescent layer by using a luminously effective amount of rare earth elements as luminescent center, when a specific amount of Gd is used together with it, luminance based on the above-mentioned rare earth element can be notably improved.

Gd is one of the rare earth elements but its luminescence level is in the ultraviolet range, so that it does not act as luminescent center in visible range. Thus, the fact that luminance is improved by doping Gd is unexpected.

These and further objects of the present invention will become more readily apparent from a better understanding of the preferred embodiments described below with reference to the following drawing figures.

BRIEF DESCRIPTION OF THE DRAWINGS

The present invention will become more fully understood from the detailed description given hereinbelow and the accompanying drawings which are given by way of illustration only and are not intended to limit the present invention, and wherein.

Figure 1:
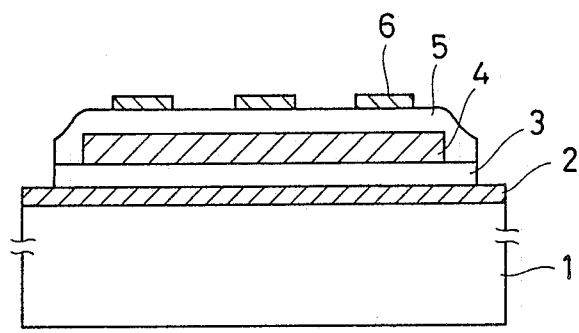
FIG. 1 is an explanatory view of structure of thin film electroluminescent device showing one emobdiment of the present invention.
Figure 3:
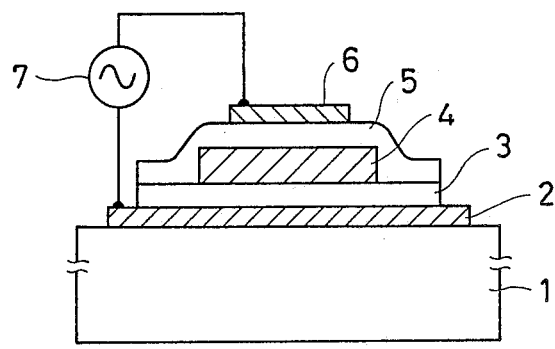
FIG. 3 is an explanatory view showing a conventional structure of thin film electroluminescent device.

The above-mentioned drawings will be described in detail in the following detailed description.

DETAILED DESCRIPTION OF THE PREFERRED EMBODIMENT

The thin film elecroluminescent device of the present invention is laminated on a translucent substrate usually made of glass or plastic (poly methyl metacrylate, poly carbonate, etc). Thus, the device of the present invention is of a double insulating structure comprising an electrode, an insulating layer a luminescent layer, an insulating layer, an electrode and substrate.

The luminescent layer, to be characteristic of the invention, is constructed such that it uses zinc sulfide as a host material, to which a rare earth element acting as luminescent center and gadolinium (Gd) are doped. In this case, known various rare earth elements can be used as luminiscent centers corresponding to intended emission colors, for example, praseodymium (Pr; White), neodymium (Nd; pink), samarium (Sm; red), europium (Eu; red), erbium (Er; green), holonium (Ho; green), dysprosium (Dy; yellow-white), and thulium (Tm; blue). Among them, it is preferable to use Pr and Sm.

The doping amount of the above-mentioned rare earth element is to be a luminously effective amount preferably a luminously optimum amount. The luminously effective amount is dependent on the kinds of the rare earth elements used and is usually about 0.1-2 atomic % in ZnS. The luminously optimum amount is, for example, about 0.2 atomic % for Sm, about 0.3 atomic % for Eu, and about 0.4 atomic % for Pr. The invention is especially useful when it uses the rare earth element in the luminously optimum amount of less than 1 atomic %.

The total amount of doping of the rare earth element and Gd is about 1-4 atomic % in ZnS. When the total amount is deviated from the range, it cannot provide a high luminance even when the rare earth element is doped in the luminescent efficient amount.

The above-mentioned luminescent layer can be formed by a known thin film deposition method, such as sputtering, EB deposition, or a CVD method. It is preferable to use the sputtering method, with a mixture of ZnS, a compound of rare earth element and a compound of Gd is used as a target. The compound of rare earth element or Gd is suitably a halide such as chloride, fluoride or the like for the improvement of crystallinity of luminescent layer. In case that the halide is used, about 0.05-6 atomic % of halogen atom concerned will be contained in the luminescent layer, but it does not have the same effect. Also, a doping amount of rare earth element and Gd in the luminescent layer can be controlled by adjusting a composition ratio of the target, and the conditions for sputtering.

The thickness of the luminescent layer is usually enough to be about 5000-15,000 Å.

Insulating layers for covering the both sides of the luminescent layer may be formed by a metal oxide such as $Ta_2O_5$. $Y_2O_3$. $TiO_2$. $Al_2O_3$. $SiO_2$ or the like, and a metal nitride such as $Si_3N_4$. AlN or the like. Further, it may be formed by admixture of more than two kinds of these metal oxides and metal nitrides. Such an insulating layer can be formed by the conventional sputtering, EB deposition or CVD method. The thickness of each the insulating layers is suitably about 1000-5000 Å.

A pair of electrodes to apply electric field to the luminescent layer may be so-called transparent electrodes such as that of ITO, $SnO_2$, and the like, which are formed by the conventional sputtering, EB deposition or CVD method. It is to be noted that it is enough that at least one of the electrodes is transparent, in that the other may be an usual metallic thin film electrode such as of aluminum and the like. It is usually preferable that the transparent electrode is disposed at the transparent substrate side and the metallic thin film electrode is formed at upper surface side of the device. Usually, preferable thickness of these electrodes are about 1000-5000 Å. When pairs of electrodes (one electrode in each pair may be a common electrode) are formed, segment display or dot matrix display can be realized.

Reason that the thin film electroluminescent device shows a higher luminance is not clear but is believed to be as follows.

Conventionally deposited ZnS thin films have many defects in films such as Zn vacancy, resulting in lower efficiency of luminance. When a specific amount of gadolinium is doped, gadolinium is substituted for the Zn vacancy to form a crystallized surface. This improves orientation of films and enlarges diameters of crystallized particles based on the improvement of crystallinity, thereby creating higher luminance.

EXAMPLES

Example 1

An example of the present invention will be detailed in accordance with the attached drawing.

FIG. 1 shows a thin film electroluminescent device of one embodiment of the present invention and includes a translucent substrate 1, a transparent electrode 2, a first insulating layer 3, a luminescent layer 4, a second insulating layer 5, a rear electrode 6. Upon manufacturing the thin film luminescent device, the transparent electrode 2 of ITO (thickness 2000 Å) is formed on the translucent substrate 1 of glass and etched to be striped. On the ITO transparent electrode is deposited the first insulating layer 3 (thicness 2000 Å) of $Ta_2O_5$, by a reactive sputtering method. Further, on the first insulating layer 3 is deposited a ZnS: Sm, Gd luminescent layer 4 (thickness 7000 Å) containing Sm at a variety of concentrations (Gd is to be constant less than 2 atomic %) by sputtering a ZnS target containing a relevant amount of $SmF_3$ and $GdF_3$ to provide a 0.1-2 atomic % Sm concentration and less than 2 atomic % Gd concentration in the luminescent layer. Additionally, on the luminescent layer 4 is deposited a second insulating layer 5 (thickness 2000 Å) by use of the same material as in the first insulating layer 3. Finally, on the second insulating layer is deposited a striped back electrode 6 Al film in the cross direction to the transparent electrode 2, for X - Y matrix drive.

Figure 2:
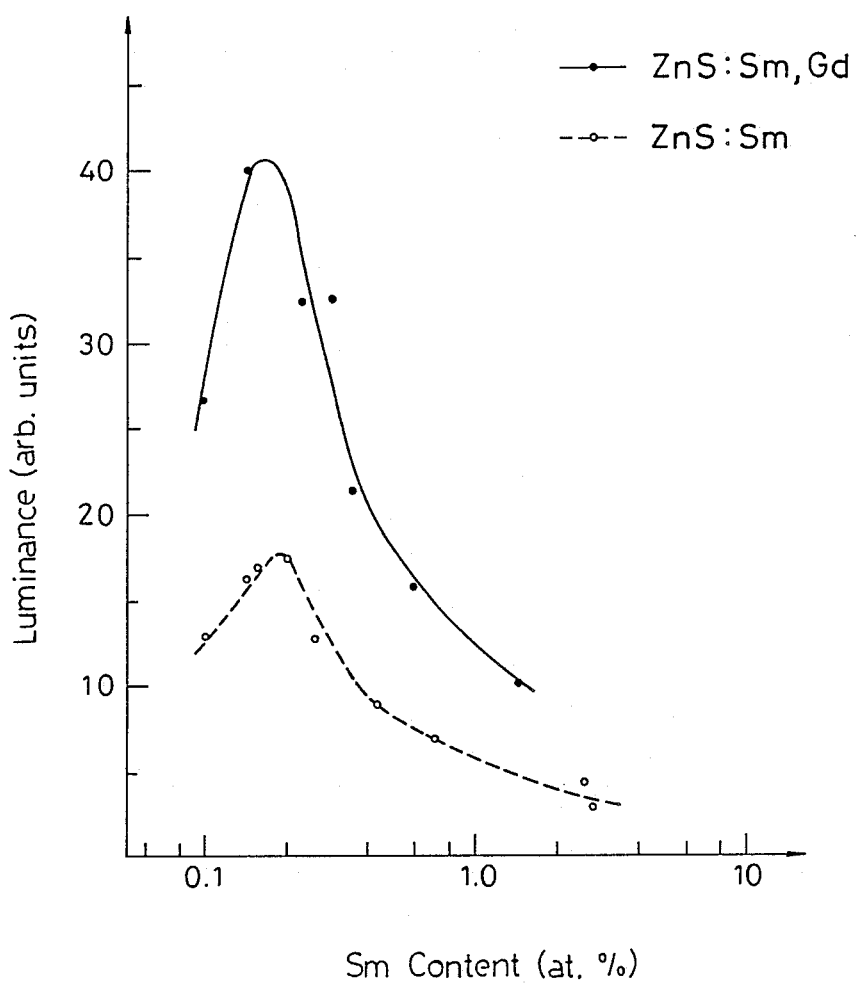
FIG. 2 is an explanatory view of characteristic properties of thin film electroluminescent device formed by the examples shown in FIGS. 2 and 6.

Voltage was applied to each the thin film electroluminescent device each having differnt contents of Sm at the respective luminescent layer 4, to measure luminance. As shown in FIG. 2, the thin film electroluminescent device having a luminescent layer 4 containing Gd concentration less than 2 atomic % presented red emission at two times the luminance in comparison with that not containing Gd.

The example shows the case of using an Sm luminescent center. The same result can be obtained by using other rare earth luminescent centers.

REFERENTIAL EXAMPLE

Figure 4:
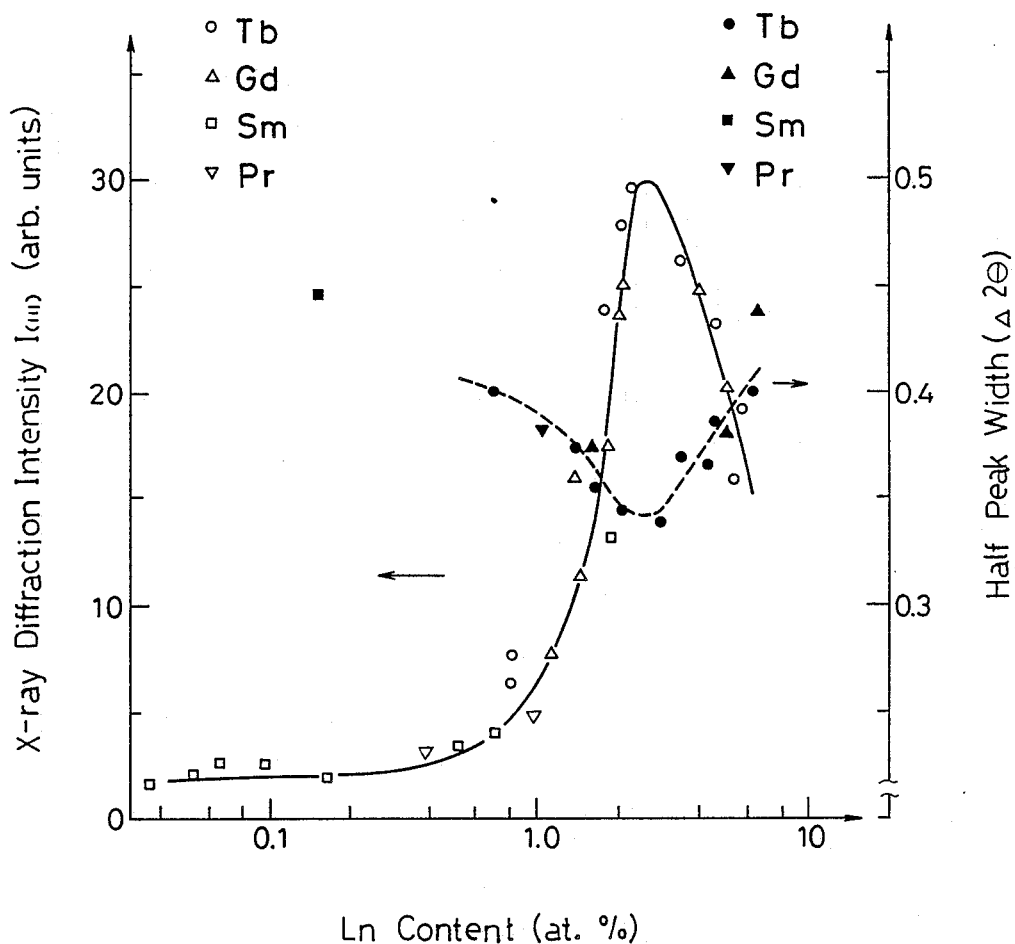
FIG. 4 is an explanatory view of characteristic properties showing a relationship between X ray diffraction peak intensiy and Ln concentration of ZnS:Ln thin films formed by a sputtering process.

Similar luminescent devices were made with various luminescent films in accordance with the Example 1, and evaluated for crystallization, luminance and the like. In FIG. 4 is shown a relationship between Ln concentration in ZnS:Ln luminescent layer made by sputtering, diffraction intensity of (111) a diffraction peak that is maximum in X ray diffraction pattern, and half peak width. As seen, the ZnS film starts to improve in orientation of (111) surface irrespective of kinds of doped Ln when Ln concentration in the film exceeds 1 atomic %. Most favorable orientation can be obtained at 2.5-3 atomic %, and orientation will be deteriorated when Ln concentration further increases. Also, as orientation is improved, half peak width decreases and enlargement of the diameter of crystallized particles occurs.

Figure 5:
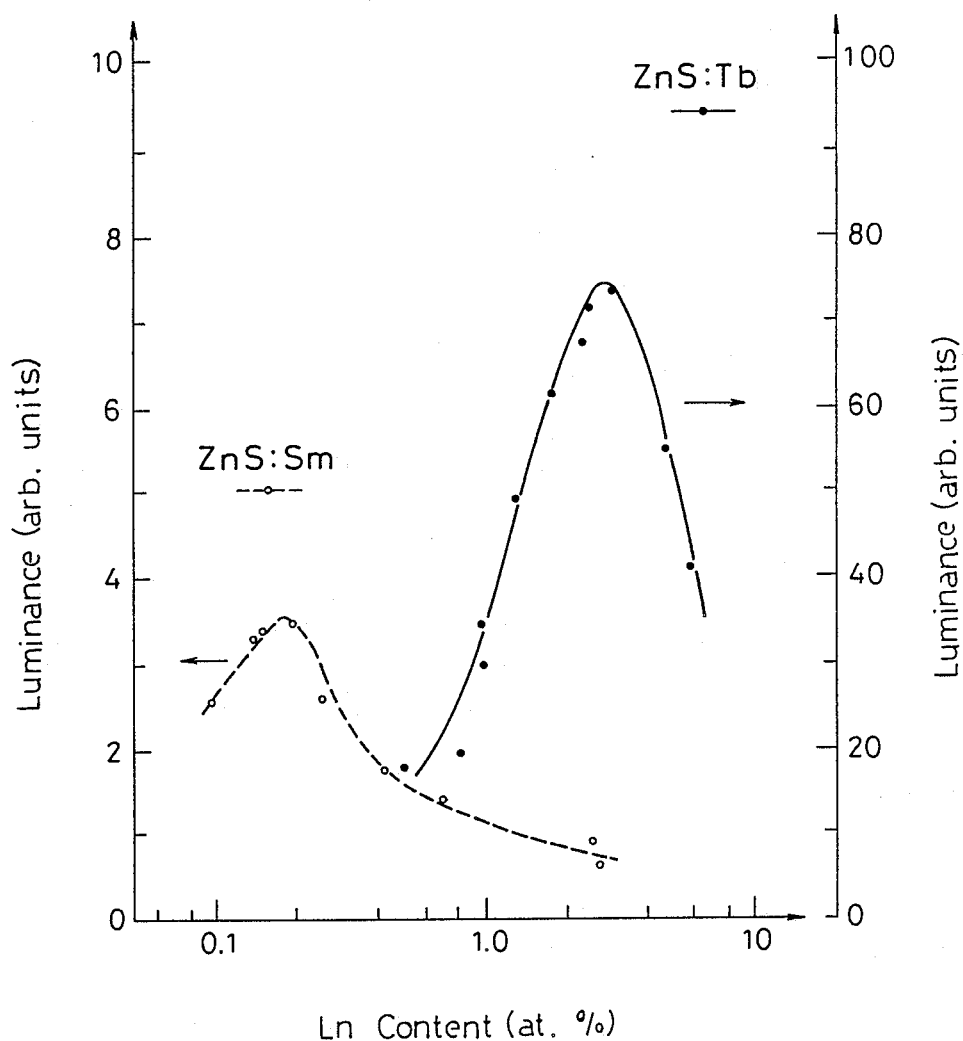
FIG. 5 is an explanatory view of characteristic properties showing a relationship between luminance and luminescent center concentration in lumlinescent layer.

Furthermore, as seen in FIG. 5, in the relation between Ln additive concentration and luminance of ZnS:Ln luminescent device using Tb and Sm as luminescent center, optimum concentration of Sm luminescent center is about 0.2 atomic % that is in the range of lower crystallinity of ZnS film. This occurs similarly in use of other luminescent centers, i.e., optimum concentration of luminescent center other than Tb is less than 1 atomic %, for example, Eu is about 0.3 atomic % and Pr is about 0.4 atomic %, wherein crystallinity of ZnS film is poor. In this case, when additive concentration is increased, crystallinity of ZnS film can be improved, but, the luminance decreases remarkably by concentration quench. In turn, in the case of the use of a Tb luminescent center enabling high brightness green-emitting electroluminescent device, maximum brightness can be obtained at a concentration of about 2.5 atomic %. This feature corresponds to the most suitable concentration for crystallinity shown in FIG. 4. The result shows that high luminance can be obtained by coincidence of increase of production efficiency of hot electron by improvement of crystallinity in ZnS host material and concentration of highest excitation efficiency.

Thus, effects by compatible use of Gd in the invention should be based on the functions of the improvement of crystallinity without any influence on emission colors. It is to be noted that when the total amount of Gd and rare earth elements exceeds 4 atomic %, Ln atoms not substituted at lattice points will be combined between the lattice to tend to lower crystallinity, thereby causing diffraction intensity to be abruptly lower. Hence, the value over 4 atomic % is not suitable for the device of the invention. Also, when the total amount Gd and rare earth elements is less than 1 atomic %, improvement in crystallinity is poor, so that it is also not suitable for provision of relevant electroluminescent device.

EXAMPLE 2

ZnS: Pr, Gd, F luminescent layer is made by using Pr presenting white emission color as luminescent center and in the same testing manner as the Example 1, and compared with ZnS: Pr, F luminescent layer. FIG. 6 is a view of characteristic properties of relationship between Pr concentration in luminescent layer and its luminance. Optimum concentration of Pr is about 0.4 atomic %. By addition of Gd (about 2 atomic %) simultaneously, luminance of about two times can be obtained, creating a similar brightness improvement effect as that of Example 1.

From the above-described embodiments of the invention, it is apparent that the present invention may be modified as would occur to one of ordinary skill in the art without departing from the spirit and scope of the present invention which should be defined solely by the appended claims. Changes and modifications of the system contemplated by the present preferred embodiments will be apparent to one of ordinary skill in the art.

What we claimed is:

1. A thin film electroluminescent (EL) device comprising:
   a luminescent layer, both sides of which are covered with insulating layers; and
   at least one pair of electrodes sandwiching said luminescent layer through the insulating layers, said luminescent layer being composed of zinc sulfide, in which Gd and a luminously effective amount of a rare earth element act as a luminescent center and are doped at a total amount of 1-4 atomic percent.

2. The device of claim 1 in which the rare earth element is Pr, Nd, Sm, Eu, Er, Ho, Dy or Tm.

3. The device of claim 2 in which the rare earth element is Pr or Sm.

4. The device of claim 1 in which the luminously effective amount of the rare earth element is about 0.1 to 2 atomic percent in ZnS.

5. The device of claim 1 in which the luminescent layer has a thickness of about 5000 to 15,000 Å.

6. The device of claim 1 in which the insulating layer is a metal oxide $Ta_2O_5$, $Y_2O_3$, $TiO_2$, $Al_2O_3$ or $SiO_2$, or a metal nitride $Si_3N_4$ or AlN.

7. The device of claim 1 in which the insulating layer has a thickness of about 1000 to 5000 Å.

8. The device of claim 1 in which at least one side of the pair of electrodes is a transparent electrode.

9. The device of claim 1 in which each of the electrodes have a thickness of about 1000 to 5000 Å.

10. The device of claim 1 which has a plural pair of the electrode for a segment display or dot matrix display.

11. A luminescent layer, for a thin film electroluminescent (EL) device, comprising:
    zinc sulfide (ZnS);
    gadolinium (Gd); and
    a rare earth element, wherein said Gd and a predetermined luminously effective amount of said rare earth element are doped into said ZnS, forming said luminescent layer.

12. A luminescent layer, as claimed in claim 11, wherein said predetermined luminously effective amount of said rare earth element, and said Gd element, are doped at a total of approximately 1-4 atomic percent.

13. A luminescent layer, as claimed in claim 11, wherein said rare earth element is Pr, Nd, Sm, Eu, Er, Ho, Dy, or Tm.

14. A luminescent layer, as claimed in claim 11, wherein said predetermined luminously effective amount of said rare earth element is approximately 0.1-2 atomic percent in ZnS.

15. A thin film electroluminescent apparatus comprising:
    a luminescent layer, including,
       zinc sulfide (ZnS), and gadolinium (Gd) and a predetermined luminously effective amount of a rare earth element doped into said ZnS;

first and second electrodes sandwiching said luminescent layer;

insulating means, surrounding said luminescent layer, for insulating said luminescent layer from said first and second electrodes; and a substrate attached to said first electrode.

16. A thin film electroluminescent (EL) apparatus as claimed in claim 15, wherein at least one of said electrodes is transparent.

17. A thin film electroluminescent (EL) apparatus, as claimed in claim 15, wherein said predetermined luminously effective amount of said rare earth element, and said Gd element, are doped at a total of approximately 1-4 atomic percent in said luminescent layer.

18. A thin film electroluminescent (EL) apparatus, as claimed in claim 15, wherein said predetermined luminously effective amount of said rare earth element is approximately 0.1-2 atomic percent in ZnS, in said luminescent layer.

19. A thin film electroluminescent (EL) apparatus, as claimed in claim 15, wherein said rare earth element in said luminescent layer is Pr, Nd, Sm, Eu, Er, Ho, Dy, or Tm.

20. A multicolor electroluminescent (EL) display apparatus comprising:

a plurality of electroluminescent elements, each said electroluminescent element including a luminescent layer, each said luminescent layer including, zinc sulfide (ZnS), and gadolinium (Gd) and a predetermined luminously effective amount of a rare earth element doped into said ZnS.

21. An apparatus, as claimed in claim 20, wherein said predetermined luminously effective amount of said rare earth element, and said Gd element, are doped at a total of approximately 1-4 atomic percent, in each said luminescent layer.

22. An apparatus, as claimed in claim 20, wherein said predetermined luminously effective amount of said rare earth element is approximately 0.1-2 atomic percent in ZnS, in each said luminescent layer.

23. An apparatus, as claimed in claim 20, wherein said rare earth element in each said luminescent layer is Pr, Nd, Sm, Eu, Er, Ho, Dy, or Tm.

24. An apparatus, as claimed in claim 20, wherein each of said plurality of electroluminescent elements further includes, first and second electrodes sandwiching said luminescent layer, insulating means, surrounding said luminscent layer, for insulating said luminescent layer from said first and second electrodes, and a substrate, attached to said first electrode.

25. An apparatus, as claimed in claim 24, wherein at least one of said electrodes is transparent.

* * * * *